UNITED STATES PATENT OFFICE.

FREDERICK H. RHODES AND ALFRED E. ROBERTS, OF PHILADELPHIA, PENNSYLVANIA, ASSIGNORS TO THE BARRETT COMPANY, A CORPORATION OF NEW JERSEY.

METHOD OF PREPARING RESINS.

1,413,558.            Specification of Letters Patent.      Patented Apr. 18, 1922.

No Drawing.      Application filed June 30, 1919. Serial No. 307,763.

*To all whom it may concern:*

Be it known that we, FREDERICK H. RHODES, and ALFRED E. ROBERTS, citizens of the United States, residing at Philadelphia, in the county of Philadelphia and State of Pennsylvania, have invented certain new and useful Improvements in Methods of Preparing Resins, of which the following is a specification.

This invention relates to the preparation of resins from naphthas containing polymerizable constituents, such as coumarone, indene, etc., and has for its object to produce such resins in a rapid and economical manner and in a more nearly pure state than has been obtained in the usual processes.

It is well known that when a naphtha containing coumarone or indene is treated with sulfuric acid the coumarone and indene are polymerized. When the naphtha containing the polymerized coumarone and indene in solution is separated from the polymerizing acid, neutralized with a solution of an alkali, separated from the alkaline solution, washed, and distilled to remove unpolymerized material, the polymerized coumarone and indene remain behind in the still as a liquid which solodifies to a resin on cooling. This resin is commonly known as paracoumarone or paraindene.

The naphtha after the polymerization with sulfuric acid retains in suspension a small amount of sulfuric acid and of sulfonic acids formed by the reaction of some of the polymerizing acid upon certain of the constituents of the naphtha. Before this polymerized naphtha can be satisfactorily distilled to recover the resins these last traces of acid must be neutralized by agitating the naphtha with a solution of an alkali, as, for example, sodium hydroxide. If this neutralization step is omitted the small amounts of acid retained by the naphtha will cause the resin obtained by the distillation of the naphtha to be very dark in color and to be less valuable for many of the purposes for which it is used in the arts.

After the neutralization of the naphtha the major portion of the alkaline solution (containing small amounts of alkali sulfates and sulfonates) separates readily from the naphtha, and may be drawn off. A small amount of the alkaline solution and salts, however, remains suspended in the oil and cannot be separated by allowing the oil to stand for any economically practicable length of time. The previously described and commonly used method of removing the small amounts of alkali and alkali salts retained in the oil by the formation of this above described suspension is to agitate the neutralized oil with successive portions of water, settling and removing each successive portion of wash water, until the ash content of the oil is sufficiently reduced. If this washing with water is omitted, the resin obtained after distilling off the volatile constituents of the naphtha will contain appreciable amounts of non-combustible impurities, as, for example, sodium sulfate and sodium hydroxide. The presence of these non-combustible impurities may cause the resin to be cloudy, to absorb water, and to turn white when exposed to water, and therefore renders it less valuable for many of the purposes for which it is used in the arts. It is therefore very desirable that these impurities be removed as completely as possible.

It has been found that in this washing of the neutralized naphtha after polymerization the water tends to form an emulsion from which the water separates only very slowly. In some cases it is necessary to allow the mixture of water and naphtha to stand for five or six days before even approximately complete separation occurs.

We have discovered that if a solution of ammonium chloride, or of a chloride of a metal of the alkali group, as, for example, sodium chloride, or of a chloride of a metal of the alkaline earth group, as, for example, calcium chloride, is used for washing the neutralized naphtha the separation of the wash solution from the naphtha takes place much more rapidly than when water alone is used for the washing. Moreover, when a solution of any of the above specified chlorides is used for washing the neutralized naphtha the formation of emulsions of the wash solution in the naphtha is minimized and substantially complete separation of the wash solution from the naphtha is easily secured. For this purpose the concentration of the solutions may be varied over somewhat wide limits with advantageous results, the most advantageous concentration depending upon such factors as the particular naphtha being treated, the extent of the polymerization, the amount and density of the acid used in the polymerizing step, the neutralizing agent, etc. Satisfactory results have been obtained, for example, by employing a sodium chloride solution containing about 3% by weight of sodium chloride. The amount of the solution that is used for washing may be about 20% by volume of the naphtha, more or less.

Some of the advantages gained by the use of a solution of the above specified chlorides for washing the neutralized naphtha are as follows:

The time of the washing operation is greatly reduced; the line of demarkation obtained by settling for any practicable length of time is more distinct than that in any of the previous processes with which we are familiar, and the loss of valuable material is greatly decreased.

It is apparent, therefore, that the use of a solution of the above specified chlorides for washing the neutralized naphtha, will effect a considerable saving in the time required for and in the losses of valuable material incident to the production of a given amount of resin from a given crude material, and will effect a considerable saving in the cost of manufacture of the resin, besides producing a resin of a high degree of purity.

While certain chlorides have been specified above, it is to be understood that any chloride may be used.

Having thus described our invention, we claim as new and desire to secure by Letters Patent:

1. In the process of producing resin from naphtha, the step which consists in washing said naphtha, after polymerization of polymerizable bodies therein and neutralization of the same, with a solution of a chloride.

2. In the process of producing resin from naphtha, the step which consists in washing said naphtha, after polymerization and neutralization of the same, with a solution of a chloride of an alkali metal.

3. In the process of producing resin from naphtha, the step which consists in washing said naphtha, after polymerization and neutralization of the same, with a solution of sodium chloride.

4. In the process of producing resin from naphtha, the step which consists in washing said naphtha, after polymerization and neutralization of the same, with a solution of sodium chloride containing about 3% sodium chloride by weight.

In testimony whereof we affix our signatures.

FREDERICK H. RHODES.
ALFRED E. ROBERTS.